(12) United States Patent
Dao

(10) Patent No.: US 12,719,507 B2
(45) Date of Patent: Aug. 25, 2026

(54) ANTENNA STRUCTURE INCLUDING POWER AND SIGNAL LINES

(71) Applicant: Atmosic Technologies, Inc., Campbell, CA (US)

(72) Inventor: Andy Dao, San Jose, CA (US)

(73) Assignee: Atmosic Technologies, Inc., Campbell, CA (US)

( * ) Notice: Subject to any disclaimer, the term of this patent is extended or adjusted under 35 U.S.C. 154(b) by 453 days.

(21) Appl. No.: 18/120,151

(22) Filed: Mar. 10, 2023

(65) Prior Publication Data

US 2024/0097717 A1 Mar. 21, 2024

Related U.S. Application Data

(60) Provisional application No. 63/408,763, filed on Sep. 21, 2022.

(51) Int. Cl.

| | |
|---|---|
| ***H04B 1/00*** | (2006.01) |
| ***H01Q 5/307*** | (2015.01) |
| ***H04B 1/40*** | (2015.01) |
| ***H04B 1/54*** | (2006.01) |

(52) U.S. Cl.

CPC .......... *H04B 1/0053* (2013.01); *H01Q 5/307* (2015.01); *H04B 1/0064* (2013.01); *H04B 1/40* (2013.01); *H04B 1/54* (2013.01)

(58) Field of Classification Search

CPC ...... H04B 1/40; H04B 1/0053; H04B 1/0064; H04B 1/0458; H04B 1/54; H01Q 1/2291; H01Q 1/273; H01Q 9/26; H01Q 1/085; H01Q 1/2266; H01Q 1/38; H01Q 21/30; H01Q 5/314; H01Q 5/48; H01Q 7/00; H01Q 5/307; H01Q 5/321

USPC .......................................................... 455/73

See application file for complete search history.

(56) References Cited

U.S. PATENT DOCUMENTS

| | | | | |
|---|---|---|---|---|
| 6,127,799 | A * | 10/2000 | Krishnan | G06K 19/0701 320/108 |
| 2017/0094671 | A1* | 3/2017 | Emmanuel | H03H 11/348 |
| 2020/0321994 | A1* | 10/2020 | Alam | H04L 25/0272 |
| 2023/0075962 | A1* | 3/2023 | Kang | G11C 7/1048 |
| 2023/0134920 | A1* | 5/2023 | Su | H01Q 1/2291 320/107 |

* cited by examiner

*Primary Examiner* — Ajibola A Akinyemi

(74) *Attorney, Agent, or Firm* — Meunier Carlin & Curfman LLP

(57) ABSTRACT

A wireless device includes one or more transmit chains configured to upconvert signals from a baseband frequency to a carrier frequency for transmission over a wireless medium, one or more receive chains configured to down-convert signals received over the wireless medium from the carrier frequency to the baseband frequency, a power rail configured to provide a supply voltage to at least the one or more transmit chains and the one or more receive chains, and a first antenna element configured to transmit the upconverted signals over the wireless medium or to receive signals transmitted over the wireless medium. The first antenna element may be formed using a first signal line associated with the transmit chains, a first signal line associated with the receive chains, or the power rail.

24 Claims, 7 Drawing Sheets

ANTENNA STRUCTURE INCLUDING POWER AND SIGNAL LINES

CROSS-REFERENCE TO RELATED APPLICATIONS

This patent application claims priority to U.S. Provisional Patent Application No. 63/408,763 entitled "ANTENNA STRUCTURE INCLUDING POWER AND SIGNAL LINES" and filed on Sep. 21, 2022, which is assigned to the assignee hereof. The disclosures of all prior applications are considered part of and are incorporated by reference in this patent application.

TECHNICAL FIELD

The present implementations relate generally to wireless devices, and specifically to antennas implemented in wireless devices.

BACKGROUND OF RELATED ART

Wireless communications systems provide various types of communications, content, and services to people around the globe and can support communications with multiple users by sharing the time, frequency, and spatial resources of a wireless medium. These multiple access technologies, which have been adopted in various telecommunication standards (such as Wireless Local Area Networks (WLANs), Personal Area Networks (PANs), Long Term Evolution (LTE) radio access networks, and Fifth Generation (5G) New Radio (NR) access networks), typically use radio frequency (RF) signals to wirelessly exchange data and other information between various wireless devices. Antennas used by wireless devices to transmit and receive RF signals may have an effective length equal to approximately one-quarter of the wavelength of the RF signals to be transmitted or received to or from one another to minimize packet loss while maximizing range and signal quality. For example, wireless devices that transmit or receive RF signals in the 2.4 GHz frequency band typically employ antennas having an effective length of approximately 31 millimeters.

Some wireless devices, particularly small form factor devices such as a stylus or smartphone, may not have sufficient circuit area or space available within to implement antennas suitable for transmitting or receiving RF signals in the 2.4 GHz frequency band. Although these wireless devices may be able to house antennas having shorter effective lengths, such shorter-length antennas may not be able to transmit or receive RF signals in the 2.4 GHz frequency band without incurring reduced wireless range, reduced signal strengths, and greater packet loss, which may be unacceptable to users.

SUMMARY

The systems, methods, and devices of this disclosure each have several innovative aspects, no single one of which is solely responsible for the desirable attributes disclosed herein.

One innovative aspect of the subject matter described in this disclosure can be implemented in a wireless device. The wireless device may include first and second circuits interconnected by a first signal line, a power source coupled to the first and second circuits by a power rail, and a first antenna element formed in a segment of the first signal line, the power rail, a signal line within the first circuit, or a signal line within the second circuit. In some implementations, the first circuit may be a baseband processor, and the second circuit may be a transceiver including a plurality of radio chains configured to output signals for transmission to the first antenna element and to input signals received by the first antenna element.

In some instances, the first antenna element includes the segment of the first signal line coupled between the baseband processor and the transceiver. In some aspects, the segment of the signal line is a serpentine shape, and an effective length of the first antenna element is based at least in part on the serpentine shape. In other instances, the first antenna element includes a segment of a signal line within the baseband processor. In some other instances, the first antenna element includes a segment of a signal line within a respective radio chain of the transceiver. In some aspects, the segment of the signal line within the respective radio chain is coupled between an amplifier and a mixer of the respective radio chain. In other aspects, the segment of the signal line within the respective radio chain is coupled between an amplifier and a digital-to-analog converter (DAC) of the respective radio chain. In some other instances, the first antenna element includes a segment of the power rail.

In some implementations, the wireless device may include a first radio-frequency (RF) choke coupled to a first end of the first antenna element, and a second RF choke coupled to a second end of the first antenna element. In some instances, each of the first and second RF chokes includes one or more inductors preventing RF signal components associated with the first antenna element from coupling to other segments of the first signal line, to other segments of the signal line within the first circuit, or to other segments of the signal line within the second circuit that are not associated with the first antenna element. In some aspects, the other segments of the first signal line, the other segments of the signal line within the first circuit, and the other segments of the signal line within the second circuit are not associated with the first antenna element. In other instances, the wireless device may also include a first coupling capacitor connected between the first end of the first antenna element and ground, and a second coupling capacitor connected between the second end of the first antenna element and ground.

In some other implementations, the wireless device may include a second antenna element formed in another segment of the first signal line, the power rail, the signal line within the first circuit, or the signal line within the second circuit. In some instances, the first antenna element is configured to transmit or receive wireless signals in a 2.4 GHz frequency band, and the second antenna element is configured to transmit or receive wireless signals in a 5 GHz frequency band. In some aspects, the first antenna element has an effective length of approximately 31 millimeters formed entirely within a first segment of the first signal line, and the second antenna element has an effective length of approximately 15.5 millimeters formed entirely within a second segment of the first signal line. In other instances, the first and second antenna elements form a dual-band radio formed entirely within the first signal line. In some other instances, the first and second antenna elements form a dual-band antenna formed entirely within the power rail. In various aspects, a frequency separation between signals transmitted by the first antenna element and signals routed along the other segments of the first signal line, the power rail, the signal line within the first circuit, or the signal line within the second circuit is at least an order of magnitude. In other instances, the wireless device may include one or more bypass capacitors coupled between the other segments of the first signal line or the power rail that are not associated with the first antenna element and ground potential.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Aspects of the present disclosure are illustrated by way of example and are not intended to be limited by the figures of the accompanying drawings.

Like numbers reference like elements throughout the drawings and specification.

DETAILED DESCRIPTION

Figure 1:
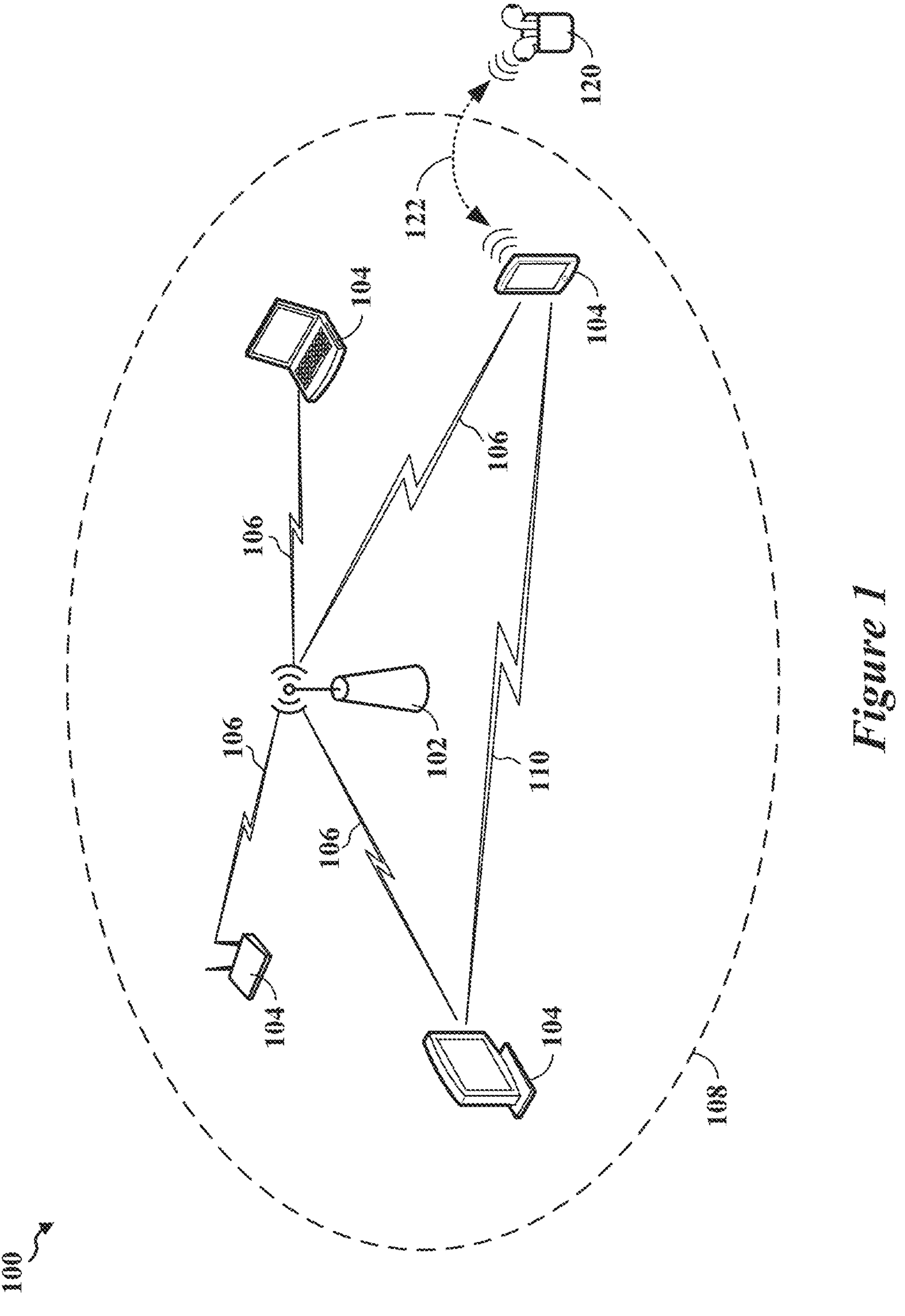
FIG. 1 shows a wireless communication system within which aspects of the present disclosure may be implemented.

The following description is directed to certain implementations for the purpose of describing innovative aspects of this disclosure. However, a person having ordinary skill in the art will readily recognize that the teachings herein can be applied in a multitude of different ways. The described implementations can be implemented in any device, system, or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system, or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO. The described implementations can also be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate to implementing an antenna structure in a wireless device that may not have sufficient circuit area or space within which to implement a conventional or dedicated antenna. More specifically, implementations of the subject matter disclosed herein relate to implementing such antenna structures in wireless devices that communicate with each other using RF signals. To most effectively transmit an RF signal at a particular frequency (e.g., to achieve maximum wireless range, a greatest signal strength, and minimal packet loss, among other examples), an antenna may have an effective length of approximately one-quarter of the wavelength corresponding to the particular frequency. For example, wireless devices that transmit or receive RF signals in the 2.4 GHz frequency band (such as WLAN communications, Bluetooth communication, and/or BLE communications, among other examples) typically employ one or more antennas having an effective length of approximately 31 millimeters. Some wireless devices may not have enough circuit area or space available to accommodate a dedicated antenna having an effective length of 31 millimeters.

For example, styluses used as input devices for tablet computers or other touch-screen devices may not have sufficient circuit area or space to accommodate a dedicated antenna approximately 31 millimeters long. Without such an antenna, these styluses may not be able to communicate with other wireless devices using Wi-Fi, Bluetooth, or BLE communications. For another example, compact or small form-factor wireless devices may lack sufficient circuit area or space to accommodate multiple antennas dedicated for transmitting or receiving RF signals in the 2.4 GHz frequency band. Without multiple antennas, these wireless devices may not be able to beamform transmissions, to transmit or receive MU-MIMO or OFDMA communications, or to achieve antenna diversity, among other examples.

In accordance with various aspects of the present disclosure, one or more signal lines and/or metal traces designed and used for routing signals between various components of a wireless device can also be used simultaneously as antenna elements to transmit and receive RF signals to or from other wireless devices. In some implementations, power rails designed and used to provide an operating voltage to various components of the wireless device may also be used as such antenna elements. In this way, aspects of the subject matter disclosed herein may allow various compact and small form-factor devices (such as a stylus) to implement an RF antenna capable of transmitting and receiving RF signals in at least the 2.4 GHz frequency band, thereby obviating the need for conventional or dedicated antennas.

Aspects of the present disclosure recognize that if the frequency separation between signals typically routed by a respective signal line or metal trace and the RF signals to be transmitted or received by the wireless device is sufficiently large (such as greater than an amount or more than a certain percentage), then at least a portion of the respective signal line or metal trace may be simultaneously used as an antenna element to transmit or receive the RF signals without creating undesirable interference that can degrade the quality of signals typically routed by the respective signal line or metal trace. In some instances, the amount of frequency separation may be an order of magnitude (although in some other instances the frequency separation may be a different amount). For example, the RF signals may be Wi-Fi, Bluetooth, or BLE signals transmitted in the 2.4 GHz frequency band, and the signal lines and/or metal traces typically may route signals having frequencies of approximately 200 MHz or less. The lower frequency signals (200 MHz or less) are not effectively radiated by the antenna elements disclosed herein, with or without the aid of a high-pass filter. In some aspects, signal lines and/or metal traces that route signals greater than 250 MHz (or some other frequency in the hundreds of MHz) are not used as antenna elements to transmit RF signals having frequencies of approximately 2.4 GHz to avoid interference between one another. This may ensure that the transmission or reception of RF signals to or from other wireless devices by a respective signal line or metal trace does not interfere with the integrity of signals propagated by the respective signal line or metal trace, either with or without isolation components such as RF chokes and bypass capacitors.

In some implementations, signal lines and/or metal traces of different lengths can be used as antenna elements configured for RF signals transmitted in different frequency bands, thereby implementing a dual-band antenna that consumes little to no circuit area of a respective wireless device. For example, in aspects for which a first signal line or metal trace has a length of approximately 31 millimeters and a second signal line or metal trace has a length of approximately 15.5 millimeters, the first signal line or metal trace can be used as a first antenna element to transmit or receive RF signals in the 2.4 GHz frequency band, and the second signal line or metal trace can be used as a second antenna element to transmit or receive RF signals in the 5 GHz frequency band (e.g., because a quarter-wavelength of a 2.4 GHz signal is approximately 31 millimeters, and a quarter-wavelength of a 5 GHz signal is approximately 15.5 millimeters).

FIG. 1 shows a wireless communication system 100 within which aspects of the present disclosure may be implemented. In some implementations, the wireless communication system 100 can be an example of a wireless local area network (WLAN) such as a Wi-Fi network. For example, the WLAN 100 can be a network implementing at least one of the IEEE 802.11 family of standards. The WLAN 100 may include numerous wireless communication devices such as an access point (AP) 102 and multiple client devices 104. While only one AP 102 is shown, the WLAN 100 may include multiple APs 102.

Each of the client devices 104 may also be referred to as a wireless station (STA) mobile station (MS), a mobile device, a mobile handset, a wireless handset, an access terminal (AT), a user equipment (UE), a subscriber station (SS), or a subscriber unit, among other possibilities. The client devices 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of client devices 104 may be referred to as a basic service set (BSS). The AP 102 may establish and manage the BSS, which may provide an example wireless coverage area 108 within which client devices 104 can communicate with one another and the AP 102. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link")—or to maintain a communication link 106—with the AP 102. The AP 102 may provide access to external networks to various STAs 104 in the WLAN via respective communication links 106.

In other implementations, the wireless communication system 100 can be a mesh network operating according to the EasyMesh™ or other wireless communication specifications provided by the Wi-Fi Alliance. In some other implementations, the wireless communication system 100 can be an example of a cellular network such as an LTE or 5G NR access network implementing one or more releases of the 3GPP wireless standard. For these implementations, the AP 102 may be replaced by a base station or access terminal that can provide a wireless service area for the client devices 104, which may be referred to as user equipment (UE). In some other implementations, the wireless communications standard 100 can be an example of a WPAN that operates according to the Bluetooth and/or BLE protocol specified by the Bluetooth® Special Interest Group (SIG). For these implementations, the AP 102 may not be needed, and the client devices 104 can communicate with one another over direct communication links (such as BLE connections or links).

In the example of FIG. 1, one of the client devices 104 is paired with a peripheral device 120 over a Bluetooth link 122. The peripheral device 120 may be any suitable wireless device that can receive wireless signals from the client device 104. The peripheral device 120 is depicted in FIG. 1 as a pair of earbuds connected to the client device 104 over the Bluetooth link 122. In other instances, the peripheral device 120 may be wireless headphones, a headset (such as an AR/VR headset), a fitness monitor, or a wireless tracker, among other examples. Although not shown for simplicity, the peripheral device 120 includes one or more transceivers that can receive signals from and/or transmit signals to the client device 104 over the Bluetooth link 122. For example, the client device 104 may transmit Bluetooth-encoded audio data to the peripheral device 120 over the Bluetooth link 122. The Bluetooth-encoded audio data, which may be streaming audio, streaming video, or the like, can be decoded by the peripheral device 120 and played for a user (not shown for simplicity). In some instances, the peripheral device 120 may include a microphone that can capture audio data (e.g., speech) provided by the user, and may transmit the captured audio data to the client device 104 over the Bluetooth link 122.

Figure 2:
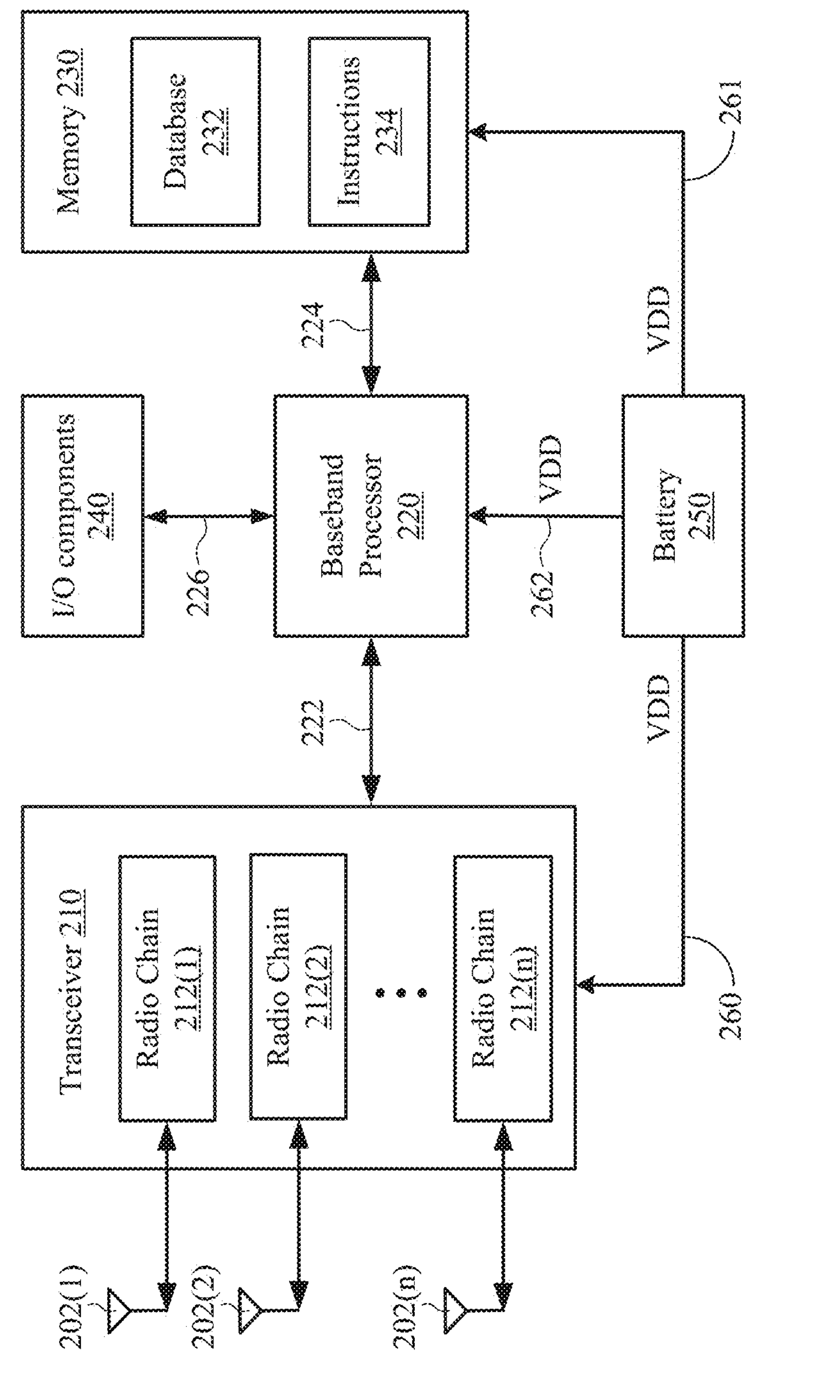
FIG. 2 is a block diagram of an example wireless device.

FIG. 2 shows a block diagram of a wireless device 200. The wireless device 200 may be an example of one or more of the client devices 104 or the peripheral device 120 described with reference to FIG. 1. The wireless device 200 includes dedicated antennas 202(1)-**202(*n*), a transceiver 210, a baseband processor 220, a memory 230, input/output (I/O) components 240, and a battery 250. The dedicated antennas ANT1-ANT2 can transmit and receive RF signals of various frequencies. In some aspects, the dedicated antennas 202(1)-202(*n*) can transmit and receive RF signals in the 2.4 GHz frequency band. In other aspects, the dedicated antennas 202(1)-202(*n*)** can also transmit and receive RF signals in the 5 GHz and/or the 6 GHz frequency band.

Although only two antennas ANT1-ANT2 are shown in the example of FIG. 2, the wireless device 200 may include one or more additional antennas, for example, to provide antenna diversity, to enable more robust multiple-input, multiple-output (MIMO) communications, or to increase the number of spatial streams over which data can be transmitted to or received from other wireless devices, among other examples.

The I/O components 240 may be or include any suitable mechanism, interface, or device to receive input (such as commands) from the user and to provide output to the user. For example, the I/O components 240 may include (but are not limited to) a graphical user interface, keyboard, mouse, microphone, speakers, and so on. Although not shown for simplicity, in some instances, the wireless device 200 may also include a display upon which items may be presented to a user. In some aspects, the display may be a touch-screen display that allows the user to interact with various features, programs, and operations of the wireless device 200.

The transceiver 210 may be coupled to the antennas 202(1)-202($n$), either directly or through an antenna selection circuit (not shown for simplicity). The transceiver 210 may be used to transmit signals to and receive signals from other wireless devices such as (but not limited to) the AP 102, one or more other wireless devices 104, or the peripheral device 120 described with reference to FIG. 1. The transceiver 210 may also be used to scan the surrounding environment to detect and identify nearby wireless devices. The transceiver 210 may include a plurality of radio chains 212(1)-212($n$) that can be used to communicate with other wireless devices according to one or more wireless communication protocols such as (but not limited to) WLAN communications, Bluetooth communications, or cellular communications. Although not shown in FIG. 2 for simplicity, each of the radio chains 212(1)-212($n$) may include a transmit chain and a receive chain. Each transmit chain may receive data to be transmitted from the baseband processor 220, upconvert the received data from a baseband frequency to a carrier frequency (such as 2.4 GHz), and may transmit the upconverted data to one or more other wireless devices via one or both the antennas 202(1)-202($n$). Each receive chain may receive data transmitted from other wireless devices via one or both the antennas 202(1)-202($n$), down-convert the received data from the carrier frequency to the baseband frequency, and may provide the down-converted data to the baseband processor 220. In some instances, the wireless device 200 may be configured for MIMO operations. The MIMO operations may include SU-MIMO operations and MU-MIMO operations. In some aspects, the wireless device 200 may also be configured for OFDMA communications or other suitable multiple access mechanisms.

The baseband processor 220 is coupled to the transceiver 210 via one or more signal lines 222, is coupled to the memory 230 via one or more signal lines 224 and is coupled to the I/O components 240 via one or more signal lines 226. The baseband processor 220 may be used to process signals received from the memory 230 and to forward the processed signals to the transceiver 210 for transmission via one or more of the antennas 202(1)-202($n$). The baseband processor 220 may also be used to process signals received from one or more of the antennas 202(1)-202($n$) via the transceiver 210 and to forward the processed signals to the memory 230. The baseband processor 220 may be any suitable processor capable of executing scripts or instructions of one or more software programs stored in the device 200 (e.g., within the memory 230). In some implementations, the baseband processor 220 may be or may include one or more microprocessors providing the processor functionality and external memory providing at least a portion of machine-readable media. In other implementations, the baseband processor 220 may be or may include an Application Specific Integrated Circuit (ASIC) with the processor, the bus interface, the user interface, and at least a portion of the machine-readable media integrated into a single chip. In some other implementations, the baseband processor 220 may be or include one or more Field Programmable Gate Arrays (FPGAs) or Programmable Logic Devices (PLDs). In some aspects, the baseband processor 220 may manage radio functions for the wireless device 200.

The memory 230 may include a database 232 that stores profile information for the wireless device 200 and/or profile information for other wireless devices. The database 232 may also store capabilities, parameters, and/or configuration information for the wireless device 200 and/or for other wireless devices. The memory 230 may also include a non-transitory computer-readable medium (e.g., one or more nonvolatile memory elements, such as EPROM, EEPROM, Flash memory, a hard drive, etc.) that may store instructions 234 for execution by the baseband processor 220. For example, the baseband processor 220 can execute the instructions 234 to perform various operations associated with the wireless device 200 and format frames carrying data, commands, capabilities, parameters, and other information for transmission to one or more other wireless devices.

The battery 250 may be any suitable battery or charge-storing device that can provide a supply voltage (VDD) that powers various circuits and components associated with the wireless device 200. In the example of FIG. 2, the battery 250 may provide a supply voltage (VDD) to the transceiver 210, the baseband processor 220, and the memory 230 via respective power rails 260, 261, and 262 (other power rails not shown for simplicity). Although not shown for simplicity, each of the components of the wireless device 200 may also be coupled to a ground plane. In some implementations, the battery 250 may be a super-capacitor that can store energy harvested from RF signals transmitted by other wireless devices by one or more energy harvesting circuits (not shown for simplicity).

As discussed, for an antenna to transmit or receive RF signals of a particular frequency, the antenna should have an effective length of approximately one-quarter the wavelength of the RF signals to be transmitted or received. As such, in aspects for which the wireless device 200 communicates with other devices using RF signals in the 2.4 GHz frequency spectrum (such as WLAN communications, Bluetooth communication, and/or some 5G NR communications, among other examples), the effective length of antennas 202(1)-202($n$) should be approximately 31 millimeters (mm). In some instances, the wireless device 200 may not have enough circuit area or space available to include a dedicated antenna having an effective length of 31 millimeters. For example, the wireless device 200 may be a stylus having a length of approximately 40 millimeters and a width of several millimeters and may not be able to accommodate a dedicated antenna (such as one of antennas 202(1)-202($n$)) having an effective length of 31 millimeters. Without such an antenna, the stylus may not be able to communicate with other wireless devices using Wi-Fi, Bluetooth, or BLE communications. For another example, compact or small form-factor wireless devices may lack sufficient circuit area or space to accommodate multiple antennas dedicated for transmitting or receiving RF signals in the 2.4 GHz frequency band. Without multiple antennas, these wireless devices may not be able to beamform transmissions, to transmit or receive MU-MIMO or OFDMA communications, or to achieve antenna diversity, among other examples.

In accordance with various aspects of the present disclosure, one or more signal lines and/or metal traces designed and used for routing signals between various components of a wireless device can also be used as antenna elements to transmit and receive RF signals to or from other wireless devices. In some implementations, power rails designed and used to provide an operating voltage to various components of the wireless device may also be used as such antenna elements. In this way, aspects of the subject matter disclosed herein may allow various compact and small form-factor devices (such as a stylus) to implement an RF antenna capable of transmitting and receiving RF signals in at least the 2.4 GHz frequency band, thereby obviating the need for conventional or dedicated antennas.

As discussed, if the frequency separation between signals typically routed by a respective signal line or metal trace and the RF signals to be transmitted or received by the wireless device is sufficiently large (such as greater than an amount), then at least a portion of the respective signal line or metal trace may be used as an antenna element to transmit or receive the RF signals. In some instances, the amount of frequency separation may be an order of magnitude (although in some other instances the frequency separation may be a different amount). For example, the RF signals may be Wi-Fi, Bluetooth, or BLE signals transmitted in the 2.4 GHz frequency band, and the signal lines and/or metal traces typically may route signals having frequencies of approximately 200 MHz or less. In some aspects, signal lines and/or metal traces that route signals greater than 250 MHz (or some other frequency in the hundreds of MHz) are not used as antenna elements to transmit RF signals having frequencies of approximately 2.4 GHz. This may ensure that the transmission or reception of RF signals to or from other wireless devices by a respective signal line or metal trace does not interfere with the integrity of signals propagated by the respective signal line or metal trace.

Figure 3A:
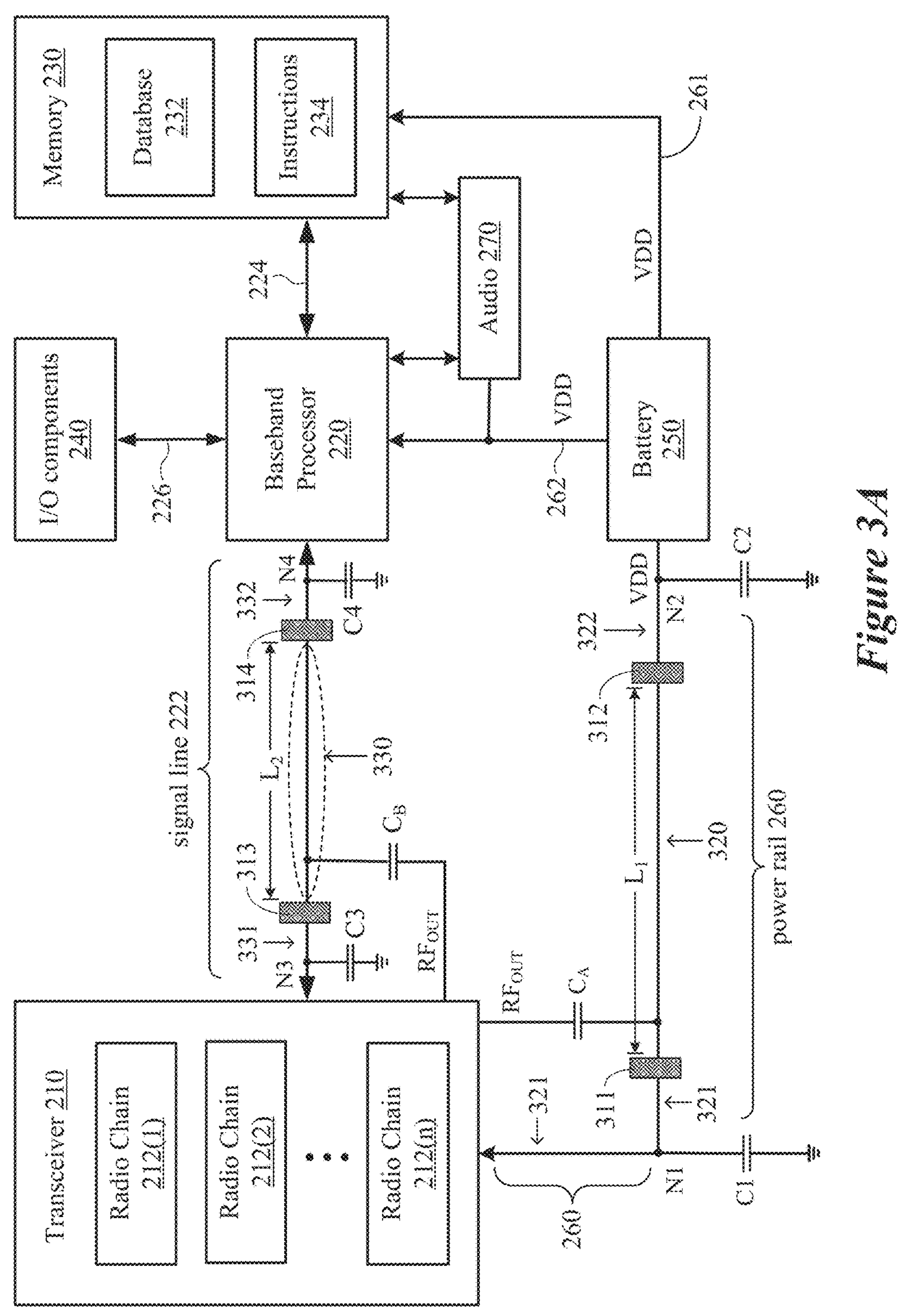
FIG. 3A is a block diagram of an example wireless device within which aspects of the present disclosure may be implemented.

FIG. 3A shows a block diagram of a wireless device 300A within which various aspects of the present disclosure can be implemented. The wireless device 300A may be an example of one or more of the client devices 104 or the peripheral device 120 described with reference to FIG. 1, or a modified example of the wireless device 200 described with reference to FIG. 2. The wireless device 300A may include all the components and features of the wireless device 200 of FIG. 2, except that the wireless device 300A of FIG. 3A may not include dedicated antennas 202(1)-202(*n*). In some implementations, segments of the power rails associated with the wireless device 300A can be used as one or more antenna elements configured to transmit or receive RF signals of a particular frequency to or from other wireless devices. In the example of FIG. 3A, a segment of the power rail 260 extending between the battery 250 and transceiver 210 with an effective length ($L_1$) of approximately 31 millimeters can be used as an antenna element 320 to transmit or receive RF signals having frequencies in the 2.4 GHz frequency band (such as Wi-Fi signals, Bluetooth signals, or BLE signals, among other examples). By using the segment of power rail 260 as antenna element 320 to transmit or receive Wi-Fi signals, Bluetooth signals, and/or BLE signals (among other examples) to or from other wireless devices, aspects of the present disclosure may reduce or even eliminate the amount of circuit area or space needed or reserved for such dedicated antennas. In this way, aspects of the present disclosure may allow wireless devices that lack sufficient circuit area or space to accommodate dedicated antennas to communicate with other wireless devices using Wi-Fi communications, Bluetooth communications, or BLE communications, among other examples.

In some implementations, RF output signals ($RF_{OUT}$) may be provided by a respective radio chain 212(1)-212(*n*) and coupled into the antenna element 320 of the power rail 260 through a first AC coupling capacitor $C_A$. The RF output signals may also be coupled into the antenna element 330 of signal line 222 through a second AC coupling capacitor $C_B$. In some aspects, the first AC coupling capacitor $C_A$ allows high-frequency components of the RF output signals to be coupled into the antenna element 320 for transmission over a wireless medium while also blocking DC power from coupling into RF circuitry associated with transceiver 210. The second AC coupling capacitor $C_B$ allows high-frequency components of the RF output signals to be coupled into the antenna element 330 for transmission over the wireless medium.

The antenna element 320 formed by power rail 260 may be isolated from other segments 321 and 322 of the power rail 260 by respective RF chokes 311 and 312. As used herein, the "other power rail segments 321 and 322" refer to segments of the power rail 260 that are not associated with and do not form part of the antenna element 320. In the example of FIG. 3A, a first RF choke 311 coupled to the power rail 260 at a first end of the antenna element 320 proximate to node N1 may be configured to isolate the other power rail segment 321 from high-frequency components associated with the transmission and reception of RF signals by the antenna element 320 of the power rail 260. In some instances, the RF choke 311 may also allow DC power to propagate along the power rail 260 (such as between the battery 250 and the transceiver 210). A second RF choke 312 coupled to the power rail 260 at a second end of the antenna element 320 proximate to node N2 may be configured to isolate the other power rail segment 322 from the high-frequency components associated with the antenna element 320. In some instances, the RF choke 312 may also allow DC power to propagate along the power rail 260 (such as between the battery 250 and the transceiver 210). In some aspects, the RF chokes 311 and 312 may include one or more inductors or other suitable active components (not shown for simplicity) that can isolate the other power rail segments 321 and 322 from RF signal components associated with transmissions or receptions by the antenna element 320. Note that antenna element 320 is disposed between RF chokes 311-312, and that RF chokes 311-312 are disposed between nodes N1 and N2.

In some aspects, a first bypass capacitor C1 coupled between node N1 and ground potential may be configured to filter RF signal components present on the other power rail segment 321 to ground. A second bypass capacitor C2 coupled between node N2 and ground potential may be configured to filter RF signal components present on the other power rail segment 322 to ground. In this way, aspects of the present disclosure may prevent high-frequency signal components associated with the transmission or reception of RF signals by the antenna element 320 from interfering with the supply voltage VDD provided on the power rail 260, particularly on the other power rail segments 321 and 322 that do not form part of the antenna element 330. Although not shown in FIG. 3A for simplicity, one or more segments of other power rails (such as power rails 261 and 262) can be used as antenna elements to transmit or receive RF signals in the manner described with respect to the antenna element 320.

In addition, or in the alternative, segments of one or more signal lines and/or metal traces designed or intended for routing signals between components of the wireless device 300A can be used as antenna elements to transmit and receive RF signals to or from other wireless devices. In the example of FIG. 3A, a segment of the signal line 222 extending between the transceiver 210 and baseband processor 220 having an effective length ($L_2$) of approximately 15.5 millimeters can be used as an antenna element 330 to transmit or receive RF signals having frequencies in the 5 GHz frequency band (e.g., Wi-Fi signals or some 5G NR signals, among other examples). By using an approximately 15.5 millimeter-long segment of signal line 222 as antenna element 330 to transmit or receive RF signals having frequencies in the 5 GHz frequency band while also using the approximately 31 millimeter-long segment of power rail 260 as antenna element 320 to transmit or receive RF signals having frequencies in the 2.4 GHz frequency band, aspects of the present disclosure can implement a dual-band antenna in the wireless device 300A without consuming circuit area or space typically allocated for multiple dedicated antennas (such as the antennas 202(1)-202(*n*) described with reference to FIG. 2).

The antenna element 330 formed by signal line 222 may be isolated from other segments 331 and 332 of the signal line 222 by respective RF chokes 313 and 314. As used herein, the "other signal line segments 331 and 332" refer to segments of the signal line 222 that are not associated with and do not form part of the antenna element 330. In the example of FIG. 3A, a first RF choke 313 coupled to the signal line 222 at a first end of the antenna element 330 proximate node N3 may be configured to isolate the other signal line segment 331 from high-frequency components associated with the transmission and reception of RF signals by the antenna element 330. Similarly, a second RF choke 314 coupled to the signal line 222 at a second end of the antenna element 330 proximate to node N4 may be configured to isolate the other signal line segment 332 from the high-frequency components associated with the antenna element 330. In some aspects, the RF chokes 313 and 314 may include one or more inductors or other suitable active components (not shown for simplicity) that can isolate the other signal line segments 331 and 332 from RF signal components associated with transmissions or receptions by the antenna element 330. Note that antenna element 330 is disposed between RF chokes 313-314, and that RF chokes 313-314 are disposed between nodes N3 and N4.

In some aspects, a third bypass capacitor C3 coupled between node N3 and ground potential may be configured to filter RF signal components present on the other signal line segment 331 to ground. A fourth bypass capacitor C4 coupled between node N4 and ground potential may be configured to filter RF signal components present on the other signal line segment 332 to ground. In this way, aspects of the present disclosure may prevent high-frequency signal components associated with the transmission or reception of RF signals by the antenna element 330 from interfering with relatively low frequency signals routed between the transceiver 210 and baseband processor 220 by the signal line 222, particularly the other signal line segments 331 and 332 that are not associated with and do not form part of the antenna element 330.

Although not shown in FIG. 3A for simplicity, one or more segments of other signal lines and/or metal traces (such as signal line 224 or signal lines within one or more of the radio chains 212(1)-212(*n*)) can be used as antenna elements to transmit or receive RF signals in the manner described with respect to the antenna element 330. In this way, aspects of the present disclosure may allow styluses and other compact wireless devices to implement dual-band antenna elements that can simultaneously transmit or receive RF signals in the 2.4 GHz and 5 GHz frequency bands.

In addition, or in the alternative, one or more portions of the battery 250 can be used as an antenna element to transmit or receive RF signals to or from the wireless device 300A. Specifically, the battery 250 may appear as a low-frequency circuit to ground potential, yet may exhibit a load impedance greater than 50 ohms at radio frequencies. In this way, the battery 250 may also be used as an antenna element to transmit or receive RF signals.

In the example of FIG. 3A, the wireless device 300A may also include audio circuitry 270 to implement one or more audio operations (or AV operations, among other examples) for the wireless device 300A. For example, the audio circuitry 270 may encode raw audio data into audio packets suitable for transmission to another device, and/or may decode audio packets received from another device into raw audio data that can be played for a user. In some instances, one or more signal line segments or power rails associated with the audio circuitry 270 can be used to implement the antenna elements disclosed herein, for example, as described with respect to FIGS. 3A-3B.

In other implementations, the shapes of one or more signal lines and/or metal traces that connect various components of the wireless device 300A can be modified in a manner that increases the effective length of the corresponding antenna element. For example, a signal line or metal trace formed as a straight line on a PCB associated with wireless device 300A between a pair of discrete components can be replaced by serpentine-shaped signal line or metal trace to increase the length of the respective signal line or metal trace, thereby also increasing the effective length of the corresponding radiating portion of the antenna 202.

Figure 3B:
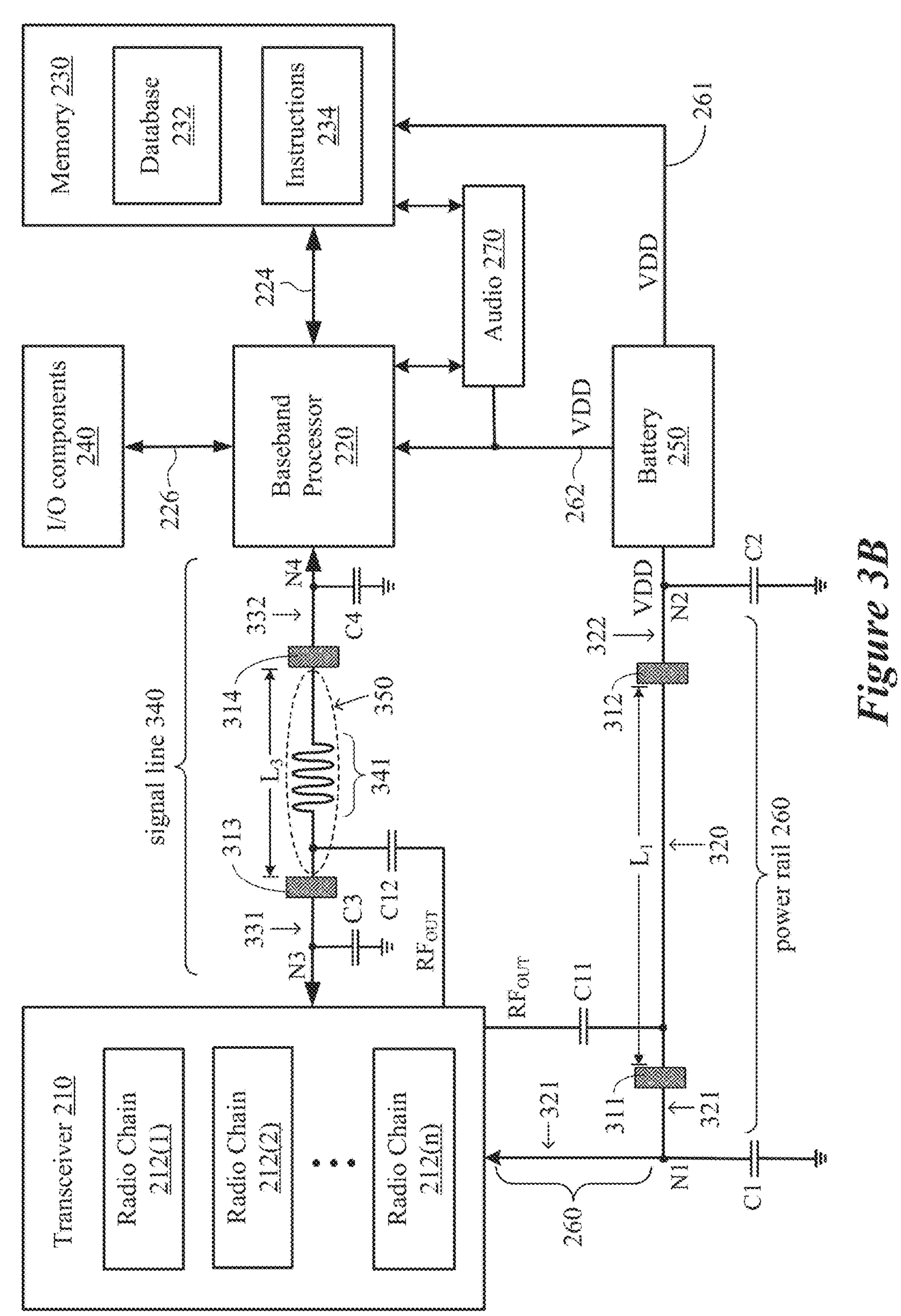
FIG. 3B is a block diagram of another example wireless device within which aspects of the present disclosure may be implemented.

For example, FIG. 3B shows a block diagram of another wireless device 300B within which various aspects of the present disclosure can be implemented. The wireless device 300B includes all the elements and features of the wireless device 300A of FIG. 3A, except that the straight signal line 222 of FIG. 3A is replaced by a signal line 340 having a serpentine-shaped segment 341 which, as depicted in the example of FIG. 3B, can form an antenna element 350. Specifically, by winding the signal line 340 back-and-forth to form or implement the serpentine-like shape of signal line segment 341, the antenna element 350 implemented by signal line 340 may have an effective length $L_3$ that is greater than the effective length $L_2$ of the antenna element 330 of FIG. 3A. In some instances, the effective length $L_3$ of antenna element 350 may be approximately 31 millimeters, thereby enabling the antenna element 350 to transmit or receive RF signals in the 2.4 GHz frequency band.

Figure 4:
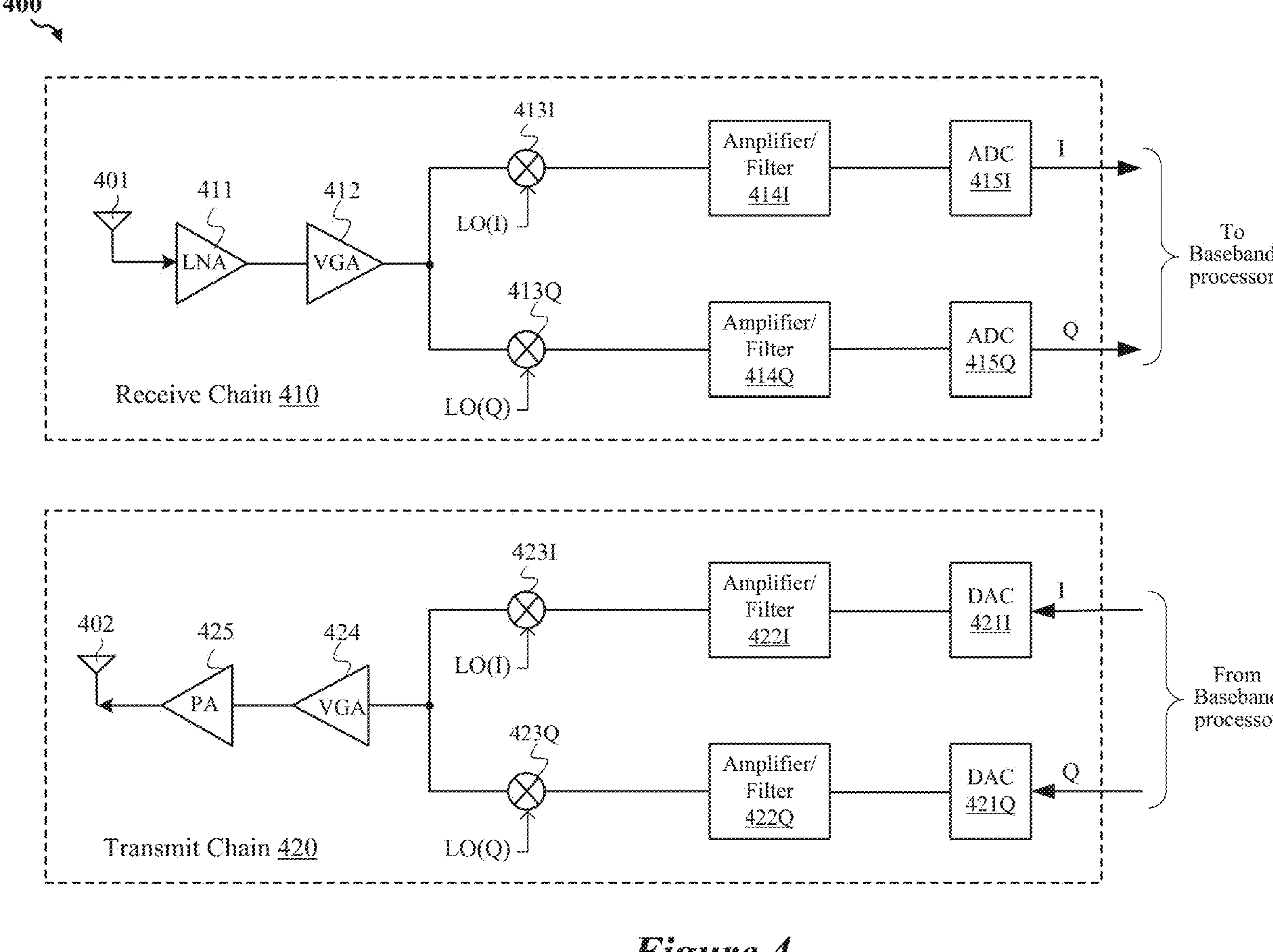
FIG. 4 is a block diagram of an example radio chain.

FIG. 4 is a block diagram of an example radio chain 400 that may be one example of the radio chains 212(1)-212(*n*) described with reference to FIG. 2. In some implementations, the radio chain 400 may be an example of the radio chains 212(1)-212(*n*) of FIGS. 3A and 3B. The radio chain 400 includes a receive (RX) chain 410 and a transmit (TX) chain 420, and may be coupled to a baseband processor (such as the baseband processor 220 of FIGS. 3A and 3B). The receive chain 410 includes a low noise amplifier (LNA) 411, a variable gain amplifier (VGA) 412, an in-phase mixer 413I, a quadrature mixer 413Q, an in-phase amplifier/filter 414I, a quadrature amplifier/filter 414Q, an in-phase analog-to-digital converter (ADC) 415I, and a quadrature ADC 415Q. In some implementations, the receive chain 410 may receive quadrature-encoded RF signals from a first antenna 401. In some aspects, the first antenna 401 may be an example of antennas 202(1)-202(*n*) described with reference to FIG. 2. The received quadrature-encoded RF signals may be amplified by the LNA 411 and the VGA 412, and then provided to mixers 413I and 413Q. The in-phase mixer 413I can mix (e.g., multiply) the amplified RF signal with an in-phase local oscillator receive signal LO(I) to down-convert the received in-phase signal from a carrier frequency to baseband frequency. The down-converted in-phase signal can be amplified and filtered by the amplifier/filter 414I, converted from an analog signal to a digital signal by the ADC 415I, and provided to the baseband processor. In a complementary way, the quadrature mixer 413Q can mix (e.g., multiply) the amplified RF signal with a quadrature local oscillator receive signal LO(Q) to down-convert the received quadrature signal from the carrier frequency to baseband frequency. The down-converted quadrature signal can be amplified and filtered by the amplifier/filter 414Q, converted from an analog signal to a digital signal by the ADC 415Q, and provided to the baseband processor.

The transmit chain 420 includes an in-phase digital-to-analog (DAC) 421I, a quadrature DAC 421Q, an in-phase amplifier/filter 422I, a quadrature amplifier/filter 422Q, an in-phase mixer 423I, a quadrature mixer 423Q, a VGA 424, and a power amplifier (PA) 425. The transmit chain 420 receives I and Q baseband signals containing data or other information to be transmitted from the baseband processor. The I signal is converted from digital to analog by the in-phase DAC 421I, amplified and filtered by the in-phase amplifier/filter 422I, and then mixed (e.g., multiplied) with an LO TX signal LO(I) to up-convert the I signal from baseband to a transmit carrier frequency by the in-phase mixer 423I. Similarly, the Q signal is converted from digital to analog by the quadrature DAC 421Q, is amplified and filtered by the quadrature amplifier/filter 422Q, and is then mixed (e.g., multiplied) with an LO TX signal LO(Q) to up-convert the Q signal from baseband to the transmit carrier frequency by the quadrature mixer 423Q. The up-converted I and Q signals are combined, amplified by the VGA 424 and PA 425, and transmitted over the wireless medium by a second antenna 402. In some aspects, the second antenna 402 may be an example of antennas 202(1)-202(*n*) described with reference to FIG. 2.

Figure 5:
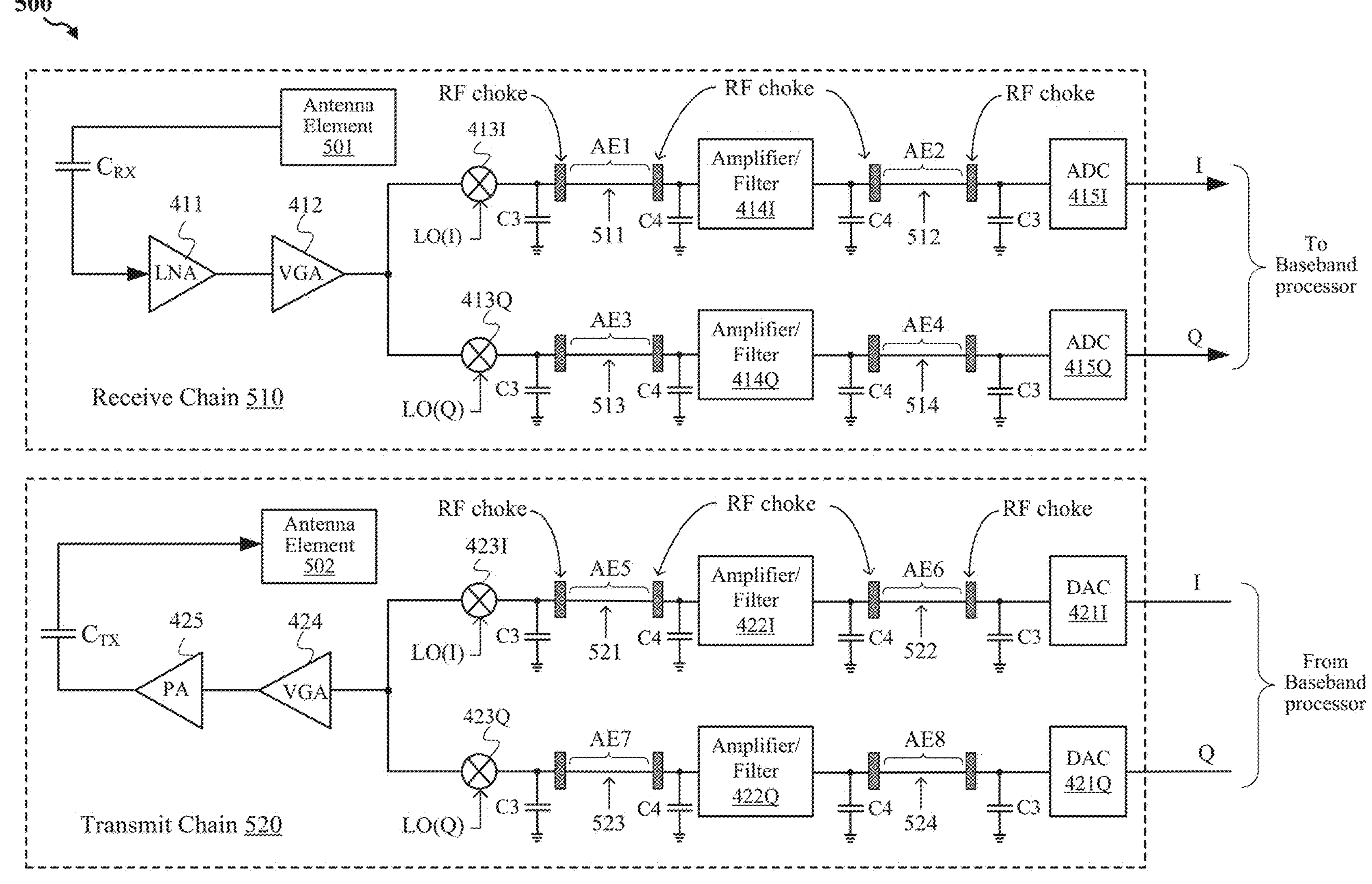
FIG. 5 is a block diagram of an example radio chain suitable for use in the wireless devices of FIGS. 3A and 3B.

In accordance with various aspects of the present disclosure, the antennas 401-402 described with reference to FIG. 4 may be omitted from a wireless device (not shown for simplicity). FIG. 5 shows an example radio chain 500 of a wireless device within which various aspects of the present disclosure may be implemented. In various aspects, the radio chain 500 may be suitable for use in the wireless devices 300A and 300B of respective FIGS. 3A and 3B. The radio chain 500 of FIG. 5 is similar to the radio chain 400 described with reference to FIG. 4, except that the radio chain 500 is associated with antenna elements 501 and 502 that can be implemented using one or more existing signal lines, metal traces, and/or power rails of an associated wireless device (device not shown for simplicity). In the example of FIG. 5, the first antenna element 501 may represent one or more antenna elements AE1-AE4 associated with receive chain 510 that can perform operations similar to those performed by the first antenna 401 of FIG. 4, and the second antenna element 502 may represent one or more antenna elements AE5-AE8 associated with transmit chain 520 that can perform operations similar to those performed by the second antenna 402 of FIG. 4. Although not shown in FIG. 5 for simplicity, each of the antenna elements AE1-AE8 may be associated with an AC coupling capacitor that provides an interface between the respective antenna element and one or both the receive chain 510 and the transmit chain 520. In some aspects, each of the antenna elements AE1-AE8 may also be associated with bypass capacitors C3 and C4, for example, as described with reference to FIG. 3A.

For the receive chain 510, antenna element AE1 may be implemented using a signal line segment 511 coupled between the mixer 413I and the amplifier/filter 414I, and may be isolated from associated non-antenna signal line segments by a corresponding pair of RF chokes. The antenna element AE2 may be implemented using a signal line segment 512 coupled between the amplifier/filter 414I and ADC 415I, and may be isolated from associated non-antenna signal line segments by a corresponding pair of RF chokes. The antenna element AE3 may be implemented using a signal line segment 513 coupled between the mixer 413Q and the amplifier/filter 414Q, and may be isolated from associated non-antenna signal line segments by a corresponding pair of RF chokes. The antenna element AE4 may be implemented using a signal line segment 514 coupled between the amplifier/filter 414Q and ADC 415Q, and may be isolated from associated non-antenna signal line segments by a corresponding pair of RF chokes. In other instances, one or more of the antenna elements AE1-AE4 may be implemented using one or more metal traces or one or more power rail segments. In some other instances, one or more of the antenna elements AE1-AE4 may be implemented using other signal wire segments associated with the receive chain 510, or using one or more signal line segments in other suitable components, circuits, or domains of the associated wireless device. For example, in some aspects, the antenna element 501 may be implemented using one or more signal line segments within or associated with audio circuitry (not shown for simplicity) of the wireless device.

For the transmit chain 520, antenna element AE5 may be implemented using a signal line segment 521 coupled between the mixer 423I and amplifier/filter 422I, and may be isolated from associated non-antenna signal line segments by a corresponding pair of RF chokes. The antenna element AE6 may be implemented using a signal line segment 522 coupled between the amplifier/filter 422I and DAC 421I, and may be isolated from associated non-antenna signal line segments by a corresponding pair of RF chokes. The antenna element AE7 may be implemented using a signal line segment 523 coupled between the mixer 423Q and the amplifier/filter 422Q, and may be isolated from associated non-antenna signal line segments by a corresponding pair of RF chokes. The antenna element AE8 may be implemented using a signal line segment 524 coupled between the amplifier/filter 422Q and DAC 421Q, and may be isolated from associated non-antenna signal line segments by a corresponding pair of RF chokes. In other instances, one or more of the antenna elements AE5-AE8 may be implemented using one or more metal traces or one or more power rail segments. In some other instances, one or more of the antenna elements AE5-AE8 may be implemented using other signal wire segments associated with the transmit chain 520, or using one or more signal line segments in other suitable components, circuits, or domains of the associated wireless device. For example, in some aspects, the antenna element 502 may be implemented using one or more signal line segments within or associated with audio circuitry (not shown for simplicity) of the wireless device.

In some aspects, the antenna elements AE1-AE4 implemented by respective signal line segments 511-514 in the receive chain 510 may be configured for wireless communications transmitted in the 2.4 GHz frequency band, for example, by selecting the effective lengths of the signal line segments 511-514 to be approximately 31 millimeters. In other aspects, the antenna elements AE1-AE4 may be configured for wireless communications transmitted in the 5 GHz frequency band by configuring the effective lengths of respective signal line segments 511-514 to be approximately 15.5 millimeters. Similarly, the antenna elements AE5-AE8 implemented by respective signal line segments 521-524 in the transmit chain 520 may be configured for wireless communications transmitted in the 2.4 GHz frequency band, for example, by selecting the effective lengths of the signal line segments 521-524 to be approximately 31 millimeters. In other aspects, the antenna elements AE5-AE8 may be configured for wireless communications transmitted in the 5 GHz frequency band by configuring the effective lengths of respective signal line segments 521-524 to be approximately 15.5 millimeters.

Figure 6:
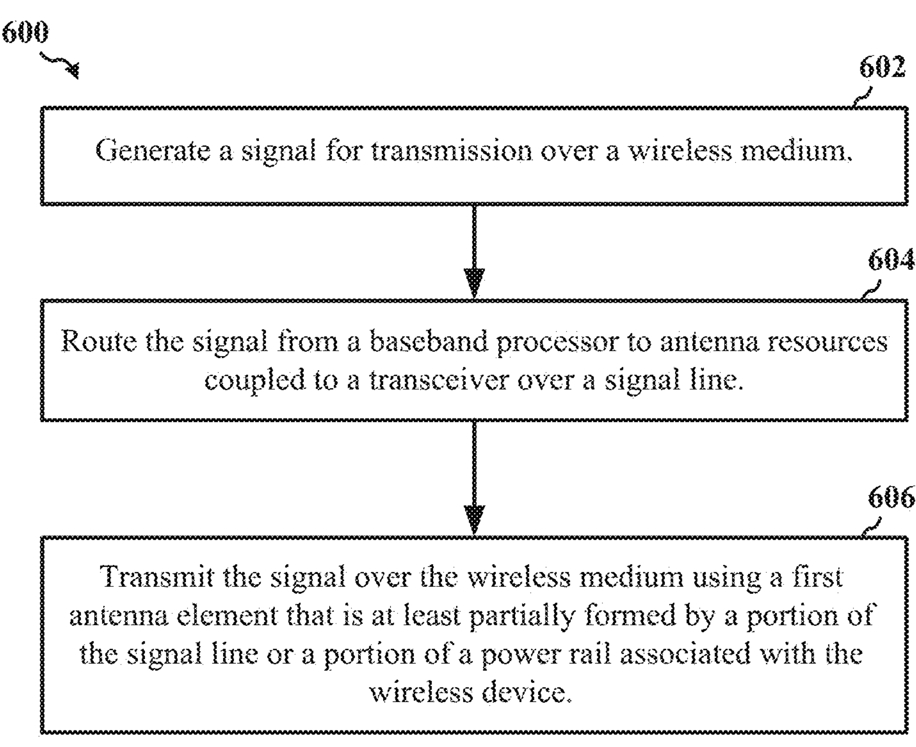
FIG. 6 shows a flowchart illustrating an example operation for wireless communications, according to various aspects of the present disclosure.

FIG. 6 shows a flowchart illustrating an example operation 600 for wireless communications, according to various aspects of the present disclosure. The operation 600 may be performed by a wireless device such as the wireless device 200 of FIG. 2, the wireless device 300A of FIG. 3A, or the wireless device 300B of FIG. 3B. For example, at block 602, the wireless device generates a signal for transmission over a wireless medium. At block 604, the wireless device routes the signal from a baseband processor to antenna resources coupled to a transceiver over a signal line. At block 606, the wireless device transmits the signal over the wireless medium using a first antenna element that is at least partially formed by a segment of the signal line or a segment of a power rail associated with the wireless device. In some instances, the carrier frequency of the transmitted and received signals is approximately 2.4 GHz, and the first antenna element has an effective length of approximately 31 millimeters formed entirely within the first signal line or the power rail. In various aspects, at least a portion or segment of the first signal line includes a serpentine shape, and the effective length of the first antenna element is based at least in part on the serpentine shape.

In some implementations, the segment of the signal line is disposed between the baseband processor and the transceiver. In other implementations, the segment of the power rail is disposed between the transceiver and a battery of the wireless device. In some other implementations, the segment of the signal line is disposed between first and second components within the transceiver. In some instances, the first component may be an amplifier and the second component may be a mixer. In other instances, the first component may be an amplifier and the second component may be a digital-to-analog converter (DAC).

In other implementations, the wireless device may include a second antenna element configured to transmit upconverted signals over the wireless medium using a 5 GHz carrier signal or to receive signals transmitted over the wireless medium using the 5 GHz carrier signal. In some instances, the second antenna element may be formed using a second signal line associated with the transmit chains, a second signal line associated with the receive chains, or the power rail. In some aspects, the second antenna element has an effective length of approximately 15.5 millimeters formed entirely within the second signal line or the power rail. In various aspects, at least a portion or segment of the second signal line includes a serpentine shape, and the effective length of the second antenna element is based at least in part on the serpentine shape.

Figure 7:
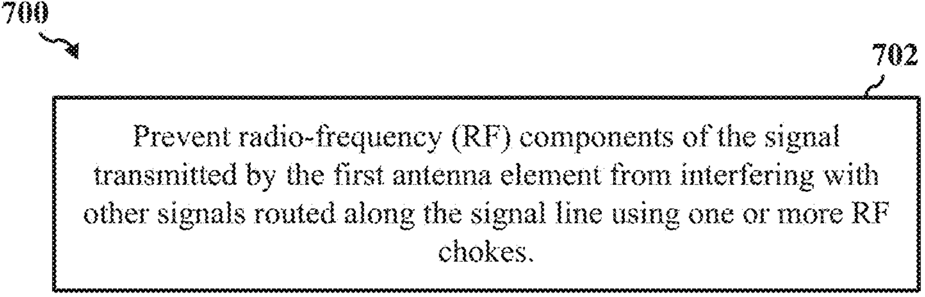
FIG. 7 shows a flowchart illustrating another example operation for wireless communications, according to various aspects of the present disclosure.

FIG. 7 shows a flowchart illustrating an example operation 700 for wireless communications, according to various aspects of the present disclosure. The operation 700 may be performed by a wireless device such as the wireless device 200 of FIG. 2, the wireless device 300A of FIG. 3A, or the wireless device 300B of FIG. 3B. In some implementations, the operation 700 may be performed after the example operation 600 described with respect to FIG. 6. For example, at block 702, the wireless device prevents radio-frequency (RF) components of the signal transmitted by the first antenna element from interfering with other signals routed along the signal line using one or more RF chokes. In other instances, AC coupling capacitors may be used to reduce such interference.

Figure 8:
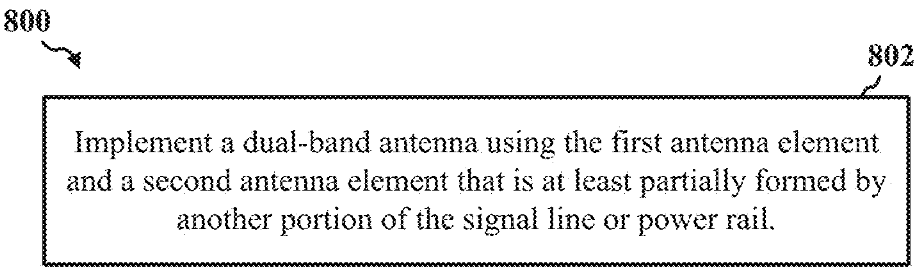
FIG. 8 shows a flowchart illustrating another example operation for wireless communications, according to various aspects of the present disclosure.

FIG. 8 shows a flowchart illustrating an example operation 800 for wireless communications, according to various aspects of the present disclosure. The operation 800 may be performed by a wireless device such as the wireless device 200 of FIG. 2, the wireless device 300A of FIG. 3A, or the wireless device 300B of FIG. 3B. In some implementations, the operation 800 may be performed after the example operation 600 described with respect to FIG. 6. In other implementations, the operation 800 may be performed after the example operation 700 described with respect to FIG. 7. For example, at block 802, the wireless device implements a dual-band antenna using the first antenna element and a second antenna element that is at least partially formed by another segment of the signal line or another segment of the power rail, the first and second antenna elements having different effective lengths. In some instances, the first antenna element has an effective length corresponding to a 2.4 GHz frequency band, and the second antenna element has an effective length corresponding to a 5 GHz or a 6 GHz frequency band.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. As used herein, "based on" is intended to be interpreted in the inclusive sense, unless otherwise explicitly indicated. For example, "based on" may be used interchangeably with "based at least in part on," unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware, and software has been described, in terms of functionality, and illustrated in the various illustrative components, blocks, modules, circuits, and processes described herein. Whether such functionality is implemented in hardware, firmware, or software depends upon the application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure and the principles and novel features disclosed herein.

Additionally, various features that are described in this specification in the context of separate implementations can also be implemented in combination in a single implementation. Conversely, various features that are described in the context of a single implementation can also be implemented in multiple implementations separately or in any suitable subcombination. As such, although features may be described herein as acting combinations, and even initially claimed as such, one or more features from a claimed combination can, in some instances, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example operations in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and the described program components and systems can be integrated together in a single software product or packaged into multiple software products.

What is claimed is:

1. A wireless device, comprising:

first and second circuits interconnected by a first signal line;

a power source coupled to the first and second circuits by a power rail; and a first antenna element formed in a segment of the first signal line, the power rail, a signal line within the first circuit, or a signal line within the second circuit, wherein the segment is defined between a first radio-frequency (RF) choke and (ii) a second RF choke, and wherein the other segments of the first signal line, the other segments of the signal line within the first circuit, and the other segments of the signal line within the second circuit are not associated with the first antenna element.

2. The wireless device of claim 1, wherein:

the first circuit comprises a baseband processor; and the second circuit comprises a transceiver including a plurality of radio chains configured to output signals for transmission to the first antenna element and to input signals received by the first antenna element.

3. The wireless device of claim 2, wherein the first antenna element comprises a segment of a signal line within the baseband processor.

4. The wireless device of claim 2, wherein the first antenna element comprises a segment of a signal line within a respective radio chain of the transceiver.

5. The wireless device of claim 4, wherein the segment of the signal line within the respective radio chain is coupled between an amplifier and a mixer of the respective radio chain.

6. The wireless device of claim 4, wherein the segment of the signal line within the respective radio chain is coupled between an amplifier and a digital-to-analog converter (DAC) of the respective radio chain.

7. The wireless device of claim 2, wherein the first antenna element comprises the segment of the first signal line coupled between the baseband processor and the transceiver.

8. The wireless device of claim 7, wherein the segment of the signal line comprises a serpentine shape, and an effective length of the first antenna element is based at least in part on the serpentine shape.

9. The wireless device of claim 1, wherein the first antenna element comprises a segment of the power rail.

10. The wireless device of claim 1, wherein each of the first and second RF chokes includes one or more inductors preventing RF signal components associated with the first antenna element from coupling to other segments of the first signal line, to other segments of the signal line within the first circuit, or to other segments of the signal line within the second circuit that are not associated with the first antenna element.

11. The wireless device of claim 1 further comprising:

a first coupling capacitor connected between the first end of the first antenna element and ground; and a second coupling capacitor connected between the second end of the first antenna element and ground.

12. The wireless device of claim 1, further comprising:

a second antenna element formed in another segment of the first signal line, the power rail, the signal line within the first circuit, or the signal line within the second circuit.

13. The wireless device of claim 12, wherein the first antenna element is configured to transmit or receive wireless signals in a 2.4 GHz frequency band, and the second antenna element is configured to transmit or receive wireless signals in a 5 GHz frequency band.

14. The wireless device of claim 13, wherein the first antenna element has an effective length of approximately 31 millimeters formed entirely within a first segment of the first signal line, and the second antenna element has an effective length of approximately 15.5 millimeters formed entirely within a second segment of the first signal line.

15. The wireless device of claim 12, wherein the first and second antenna elements comprise a dual-band radio formed entirely within the first signal line.

16. The wireless device of claim 12, wherein the first and second antenna elements comprise a dual-band antenna formed entirely within the power rail.

17. The wireless device of claim 12, wherein a frequency separation between signals transmitted by the first antenna element and signals routed along the other segments of the first signal line, the power rail, the signal line within the first circuit, or the signal line within the second circuit is at least an order of magnitude.

18. The wireless device of claim 12, further comprising: one or more bypass capacitors coupled between the other segments of the first signal line or the power rail that are not associated with the first antenna element and ground potential.

19. The wireless device of claim 1, wherein the first antenna element is at least partially formed by a battery associated with the wireless device.

20. A wireless device, comprising:

a baseband processor and a transceiver interconnected by a signal line, the transceiver including a plurality of radio chains configured to output signals for transmission from the wireless device and to input signals received by the wireless device;

a power source coupled to the baseband processor and the transceiver by a power rail; and a first antenna element formed within a segment of the signal line interconnected between the baseband processor and the transceiver, wherein the segment of the signal line comprises a serpentine shape and an effective length of the first antenna element is based at least in part on the serpentine shape.

21. The wireless device of claim 20, further comprising: a second antenna element formed within another segment of the signal line interconnected between the baseband processor and the transceiver.

22. The wireless device of claim 21, wherein the first and second antenna elements comprise a dual-band radio formed entirely within the signal line interconnected between the baseband processor and the transceiver.

23. The wireless device of claim 20, further comprising: a second antenna element formed in another signal line interconnected between the baseband processor and the transceiver.

24. The wireless device of claim 23, wherein the first antenna element is configured to transmit or receive wireless signals in a 2.4 GHz frequency band, and the second antenna element is configured to transmit or receive wireless signals in a 5 GHz frequency band.

* * * * *